United States Patent
Yamazaki et al.

(10) Patent No.: US 10,358,125 B2
(45) Date of Patent: Jul. 23, 2019

(54) HYBRID VEHICLE POWERTRAIN TORQUE HOLE FILL DURING TRANSMISSION SHIFT

(71) Applicant: FORD GLOBAL TECHNOLOGIES, LLC, Dearborn, MI (US)

(72) Inventors: Mark Steven Yamazaki, Canton, MI (US); Christopher John Teslak, Plymouth, MI (US); Bernard D. Nefcy, Novi, MI (US); Rajit Johri, Canton, MI (US); Justin Panhans, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 320 days.

(21) Appl. No.: 15/449,452

(22) Filed: Mar. 3, 2017

(65) Prior Publication Data

US 2018/0251117 A1 Sep. 6, 2018

(51) Int. Cl.
*B60W 20/15* (2016.01)
*B60W 10/06* (2006.01)
*B60W 10/08* (2006.01)
B60W 30/19 (2012.01)

(52) U.S. Cl.
CPC ............ *B60W 20/15* (2016.01); *B60W 10/06* (2013.01); *B60W 10/08* (2013.01); *B60W 30/19* (2013.01); *B60W 2510/1005* (2013.01); *B60W 2510/105* (2013.01); *B60W 2710/0605* (2013.01); *B60W 2710/0666* (2013.01); *B60W 2710/083* (2013.01); *B60Y 2200/92* (2013.01); *Y02T 10/6286* (2013.01); *Y10S 903/93* (2013.01)

(58) Field of Classification Search
CPC .............................. B60W 20/15; B60W 30/19
See application file for complete search history.

(56) References Cited

U.S. PATENT DOCUMENTS

| | | | | |
|---|---|---|---|---|
| 8,738,254 B2 * | 5/2014 | Lee | ........................ | F16H 61/061 701/58 |
| 8,808,141 B2 * | 8/2014 | Shelton | ................. | B60W 20/10 477/5 |
| 8,938,340 B2 * | 1/2015 | Teslak | ..................... | F16H 61/04 477/111 |
| 8,983,745 B2 | 3/2015 | Neelakantan et al. | | |
| 9,260,102 B2 | 2/2016 | Teslak et al. | | |
| 9,278,683 B2 | 3/2016 | Kaltenbach et al. | | |
| 10,207,702 B2 * | 2/2019 | Oh | ........................ | B60W 20/30 |
| 2010/0273604 A1 * | 10/2010 | Imaseki | ................. | B60K 6/365 477/5 |
| 2018/0257633 A1 * | 9/2018 | Meyer | ................... | B60W 20/13 |
| 2019/0001962 A1 * | 1/2019 | Park | ..................... | B60W 20/30 |

* cited by examiner

*Primary Examiner* — Sherry L Estremsky
(74) *Attorney, Agent, or Firm* — David B. Kelley; Brooks Kushman P.C.

(57) ABSTRACT

A vehicle includes an engine and an electric machine coupled to a gearbox. A controller is programmed to predict, at an onset of a shift, a supplemental torque profile to fill a torque hole expected during the shift and an available electric machine torque during the shift. The controller is further programmed to, in response to the supplemental torque profile exceeding the available electric machine torque during the shift, operate the engine from the onset to achieve a torque reserve in anticipation of increasing the engine torque.

20 Claims, 6 Drawing Sheets

HYBRID VEHICLE POWERTRAIN TORQUE HOLE FILL DURING TRANSMISSION SHIFT

TECHNICAL FIELD

This application generally relates to a hybrid vehicle powertrain torque control strategy during transmission shift events.

BACKGROUND

A vehicle includes a transmission having different gear ratios that may be selected during a drive cycle. Changing gears in the transmission is automated by a control device that operates clutches and actuators in the transmission to effect a gear change. The clutches are operated during a shift to reduce torque on a first clutch, operate an actuator to change a gear ratio, and increase torque on a second clutch. The nature of the shift operation in the transmission causes a loss of torque (referred to as a torque hole) during the shift. The torque hole may be detected by vehicle occupants as a change in acceleration of the vehicle.

SUMMARY

A vehicle includes an engine and an electric machine coupled to a gearbox. The vehicle further includes a controller programmed to, responsive to an onset of a shift of the gearbox and a predicted supplemental torque profile, that defines torque to be applied during the shift to fill a torque hole, exceeding a predicted available electric machine torque during the shift, operate the engine from the onset to achieve a torque reserve in anticipation of increasing engine torque.

A powertrain control system includes a controller programmed to, responsive to an onset of a shift of a gearbox and a predicted supplemental torque profile, that defines torque to be applied during the shift to fill a torque hole, exceeding a predicted available torque of an electric machine coupled to the gearbox during the shift, operate an engine coupled to the gearbox at the onset of the shift to achieve a torque reserve.

A method includes predicting, by a controller, at an onset of a shift of a gearbox, a supplemental torque profile for filling a torque hole and an available torque of an electric machine coupled to the gearbox. The method further includes operating, by the controller, an engine coupled to the gearbox to achieve a torque reserve at the onset of the shift in response to the supplemental torque profile exceeding the available torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
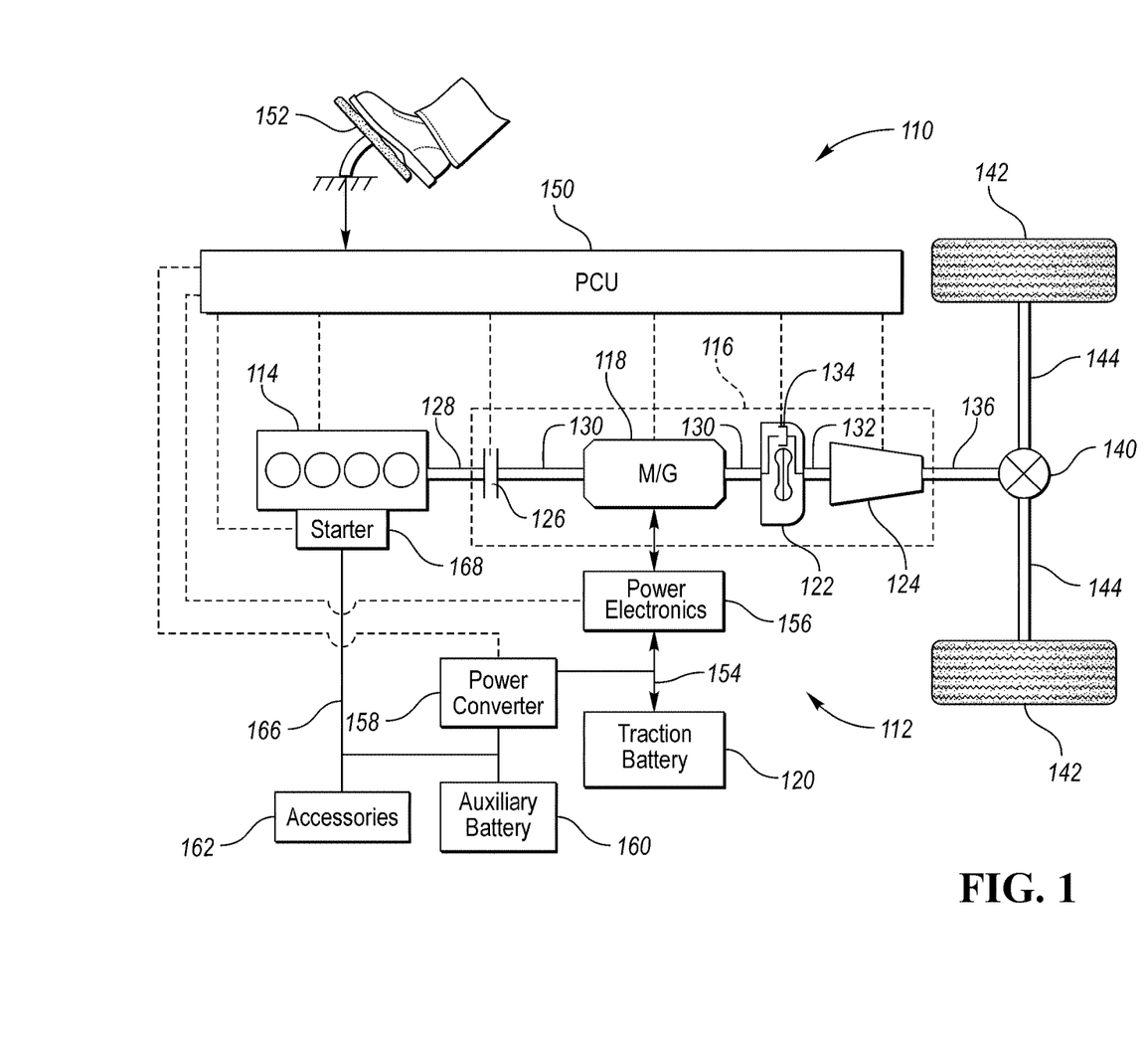
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. The M/G shaft 130 extends through the M/G 118. The M/G 118 is continuously drivably connected to the M/G shaft 130, whereas the engine 114 is drivably connected to the M/G shaft 130 only when the disconnect clutch 126 is at least partially engaged.

The M/G 118 is connected to the torque converter 122 via M/G shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements may be controlled according to a shift schedule that sequences connecting and disconnecting certain elements of the gear sets to control the ratio between a transmission output shaft 136 and the transmission input shaft 132. The gearbox 124 is automatically shifted from one ratio to another based on various vehicle and ambient operating conditions by an associated controller 150, such as a powertrain control unit (PCU). The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 may further include an associated powertrain control unit (PCU) 150. While illustrated as one controller, the PCU may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge the traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller (PCU) 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by the controller (PCU) 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by the controller (PCU) 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as the PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle 110. In general, depressing and releasing the accelerator pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The controller 150 also controls the timing of gear shifts within the gearbox 124, as well as engagement or disengagement of the disconnect clutch 126 and the torque converter bypass clutch 134. Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle 110 with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle 110 with the M/G 118 as the sole power source, the power flow remains the same except the disconnect clutch 126 is operated to isolate the engine 114 from the remainder of the powertrain 112. Combustion in the engine 114 may be disabled or otherwise OFF during this time to conserve fuel. The traction battery 120 transmits stored electrical energy through a high-voltage (HV) bus 154 to a power electronics module 156 that may include an inverter, for example. The high-voltage bus 154 includes wiring and conductors for conducting current between modules and may include a positive-side conductor and a negative- or return-side conductor. The power electronics 156 convert DC voltage from the traction battery 120 into AC voltage to be used by the M/G 118. The controller 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the traction battery 120. The M/G 118 may act as a generator while the engine 114 is providing propulsion power for the vehicle 110, for example. The M/G 118 may additionally act as a generator during times of regenerative braking in which rotational energy from wheels 142, while rotating, is transferred back through the gearbox 124 and is converted into electrical energy for storage in the traction battery 120.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

The vehicle 110 may utilize the M/G 118 to start the engine 114. The controller 150 may command the disconnect clutch 126 to close and request torque from the M/G 118 via the power electronics 156. The torque from the M/G 118 rotates the engine 114 so that the engine speed increases above a predetermined speed at which time the engine 114 may be commanded to provide fuel and spark to maintain continued engine rotation. The torque converter 122 may provide some torsional isolation during engine cranking and initial startup. In some vehicle configurations, a low-voltage starter motor 168 may also be coupled to the engine 114 to provide a secondary or backup means of starting the engine 114.

The vehicle 110 may further include a power converter module 158 and an auxiliary battery 160. The auxiliary battery 160 may be a low-voltage battery such as a 12 Volt battery that is commonly used in automobiles. Terminals of the auxiliary battery 160 may be electrically coupled to a low-voltage bus 166. The low-voltage bus 166 includes wiring and conductors for conducting current between connected modules. The power converter 158 may be electrically coupled between the high-voltage bus 154 and the low-voltage bus 166. The power converter module 158 may be a DC/DC converter that is configured to convert voltage from the high-voltage bus 154 to a voltage level compatible with the low-voltage bus 166. The power converter 158 may be further configured to convert voltage from the low-voltage bus 166 to voltage compatible with the high-voltage bus 154. For example, the power converter 158 may be configured to provide a two-way flow of current between the high-voltage bus 154 and the low-voltage bus 166.

The M/G 118 may be a permanent magnet (PM) electric machine. A PM electric machine includes a rotor and a stator. The stator may include windings for producing a magnetic field to rotate the rotor. Current through the stator windings may be controlled to vary the magnetic field acting on the rotor. The rotor of a PM machine includes permanent magnets that create a magnetic field that interacts with the stator magnetic field to cause rotation of the rotor. The rotor speed may be controlled by the frequency of the magnetic field created by the stator. Since the rotor of the PM machine has magnets, rotating the rotor causes a magnetic field that interacts with the stator windings. The result is a voltage or back electromotive force (EMF) in the stator circuit. The magnitude of the back-EMF increases with the rotational speed of the rotor.

The M/G 118 may be a three-phase machine. The three-phase PM machine may include three phase terminals that are coupled to the stator windings. Each phase terminal is coupled to a different set of stator windings. By controlling the current and voltage applied to each of the terminals, the stator magnetic field may be controlled. The phases may be controlled so that a phase angle difference of the voltages between each of the phases is 120 degrees.

The controller 150 may control the operation of the gearbox 124. The controller 150 may facilitate shifting between gears of the gearbox. The controller 150 may coordinate operation of clutches within the gearbox 124 to achieve smooth gear transitions. The clutches may be hydraulically actuated and pressure may be controlled using solenoids that are electrically coupled to the controller 150. For example, to achieve a shift, pressure may be removed from a first clutch, while pressure is added to a second clutch. The first clutch may be referred to as the off-going clutch and the second clutch may be referred to as the on-coming clutch. During the shift, torque transfer through gearbox 124 is transitioned from a first gear to a second gear by operation of the clutches.

During the shift, the torque transferred by the gearbox 124 may change. The controller 150 may be programmed to ensure that the torque does not change abruptly or by a large amount during shifts. During the shift process, the torque through the gearbox 124 may decrease for a period of time while the clutches are changing states. During the transition, the clutches are not fully engaged and as a result, the full amount of torque at the input may not be transferred to the output. This may be referred to as a torque hole. The controller 150 may attempt to compensate for the torque hole by controlling operation of the M/G 118 and the engine 114 to adjust the torque at the input of the gearbox 124. The controller 150 may attempt to add torque so that the torque at the output of the gearbox 124 does not decrease or decreases minimally during the shift.

Figure 2:
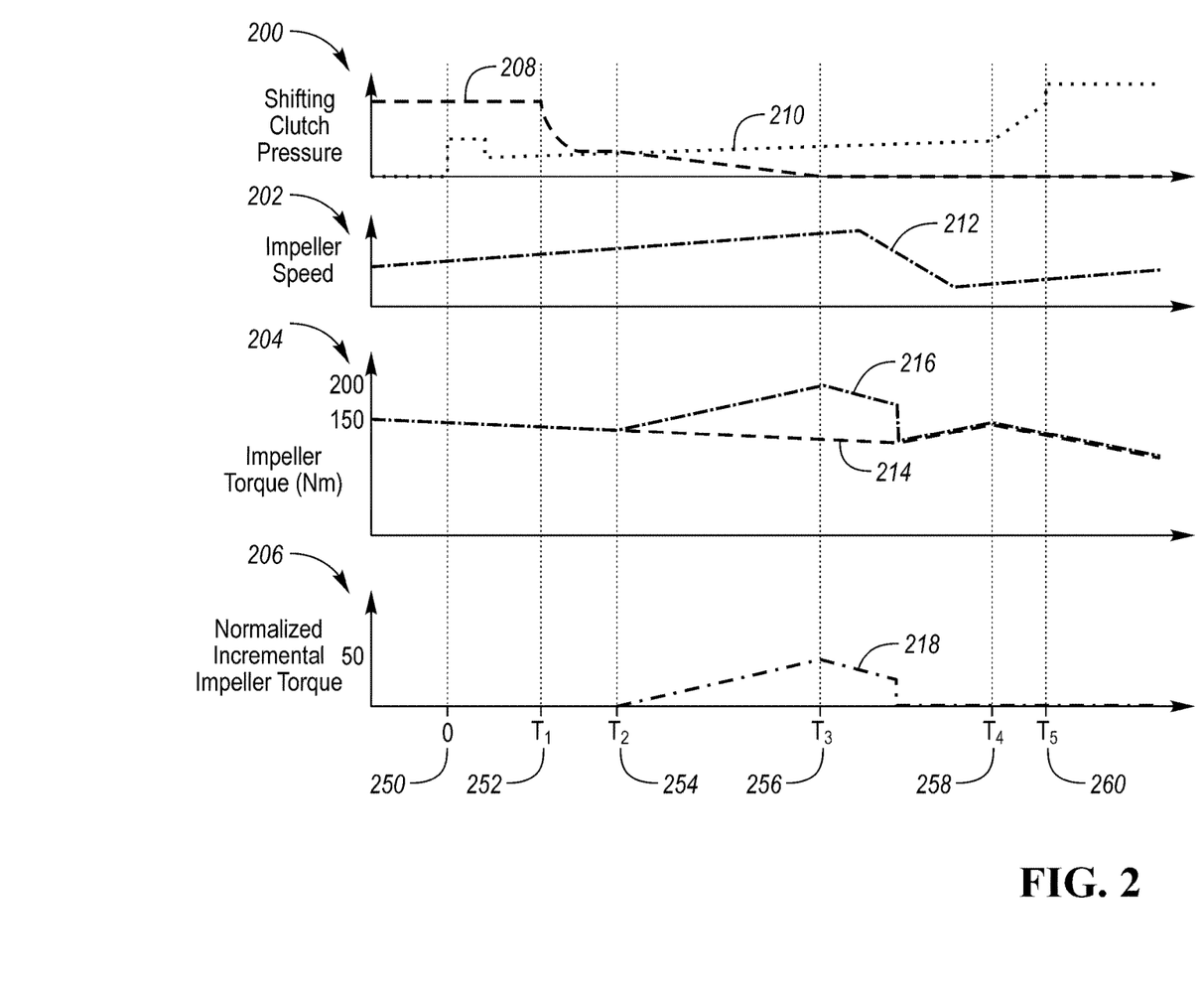
FIG. 2 depicts an example response of impeller torque to fill a torque hole during a shift.

FIG. 2 depicts a timing diagram for a possible upshift cycle. The diagram depicts the changes in torque during a shift. Graph 200 is a plot of clutch pressures for the shifting clutches and depicts on off-going clutch pressure 208 and an on-coming clutch pressure 210. Graph 202 is a plot of impeller speed 212 during the shift. The impeller speed 212 may be the rotational speed of the M/G shaft 130 which is coupled to the impeller of the torque converter 122. Graph 204 is a plot of selected torques during the shift including an uncompensated impeller torque 214 and an incremental torque hole fill (THF) torque 216. The graphs 200, 202, 204, and 206 share a common time scale.

The shift begins at an onset time 250. The shift may be initiated by a driver demand for torque or a change in vehicle speed. The shift may be manually requested by a driver (e.g., manual shift button/mechanism). The onset time 250 may be initiated by receipt of a request to change gears. The onset time 250 may be initiated by monitoring conditions to determine when the gear shift is to be initiated. The conditions may be selected to optimize fuel economy, acceleration performance, or other vehicle performance criteria. At the onset time 250, torque may be increased on the on-coming clutch by increasing the applied pressure of the on-coming clutch to a predetermined intermediate torque. The torque increase to the on-coming clutch prepares the on-coming clutch to carry the torque. At time $T_1$ 252, the off-going clutch may be commanded to begin releasing torque. Torque may be released from the off-going clutch by reducing the clutch pressure to a predetermined pressure. At time $T_2$ 254, the off-going clutch pressure may be fully released. This release of torque on the off-going clutch may result in a torque hole at the transmission output. At time $T_3$ 256, the gear ratio may be changed. At time $T_4$ 258, the on-coming clutch pressure may be ramped up to a predetermined final value. At time $T_5$ 260, the on-coming clutch pressure is maintained at the final value and the gear shift is complete.

Graph 206 is a plot of a normalized THF torque 218 for filling the torque hole during the shift. The normalized THF torque 218 represents an amount of torque that must be added to the uncompensated impeller torque 214 to fill the torque hole. Graph 206 depicts the amount of torque at the impeller of the torque converter 122. In this example, the torque converter input torque corresponds to the torque at the M/G shaft 130. The controller 150 may operate the engine 114 and/or M/G 118 to provide the amount of torque to compensate for the torque hole.

Figure 3:
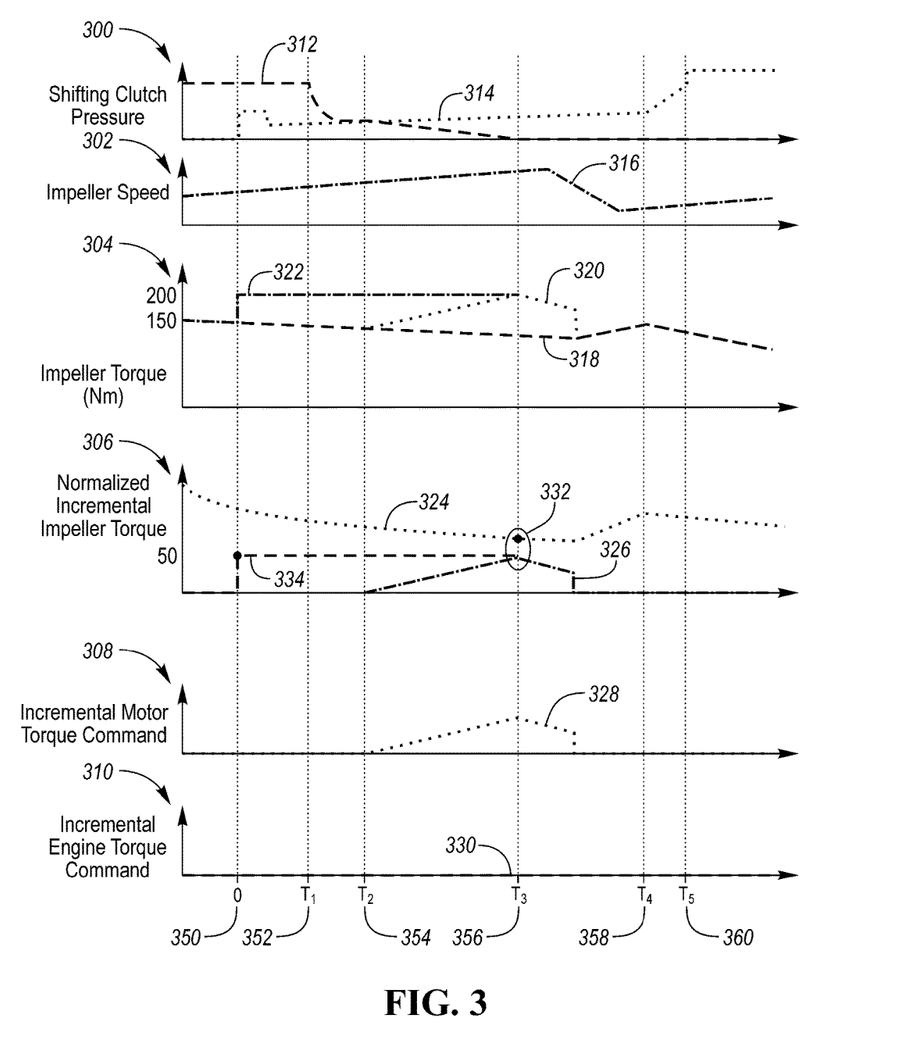
FIG. 3 depicts an example response using motor torque to fill the torque hole during a shift.

FIG. 3 depicts a timing diagram for a possible upshift cycle using only motor torque to fill the torque hole. Graph 300 is a plot of clutch pressures for the shifting clutches and depicts on off-going clutch pressure 312 and an on-coming clutch pressure 314. Graph 302 is a plot of the impeller speed 316 during the shift. Graph 304 is a plot of selected torques during the shift including an uncompensated impeller torque 318, a compensated impeller torque 320, and a predicted maximum compensated impeller torque 322. Graph 306 is a plot of a supplemental torque profile 326 that is the normalized amount of torque for filling the torque hole during the shift. Graph 306 also depicts a predicted available motor torque 324 and a predicted maximum THF torque 334. Graph 308 depicts an incremental motor torque command 328. Graph 310 depicts an incremental engine torque command 330. The graphs 300, 302, 304, 306, 308 and 310 share a common time scale.

The shift begins at an onset time 350. The onset time 350 may be determined as described previously. At the onset time 350, torque may be increased on the on-coming clutch by increasing the applied pressure of the on-coming clutch to a predetermined intermediate torque. The torque increase to the on-coming clutch prepares the on-coming clutch to carry the torque. At the onset time 350, the controller 150 may execute an algorithm to predict the incremental torque hole torque.

The controller 150 may estimate the resulting torque hole and generate the supplemental torque profile 326 according to the estimate. The supplemental torque profile 326 may depict the torque needed to offset the torque hole to reduce the impact of the torque hole during the shift. The supplemental torque profile 326 may be an amount of torque to be added to the uncompensated impeller torque 318 to fill the torque hole that would normally occur during the shift. The supplemental torque profile 326 may define the predicted maximum THF torque 334 that is predicted during the shift.

The predicted maximum THF torque 334 may be a peak value of the supplemental torque profile 326. The predicted maximum THF torque 334 may be derived from a predetermined table indexed by input torque and input speed. The predicted maximum THF torque 334 may be determined from the predicted output torque in the target gear. The predicted maximum THF torque 334 may be determined as a function of a turbine speed and turbine torque of the torque converter 122. In some configurations, the controller 150 may first predict the maximum THF torque 334 and construct the supplemental torque profile 326 based on the maximum THF torque 334. For example, the supplemental torque profile 326 may increase linearly from zero at $T_2$ 354 to the maximum THF torque 334 at $T_3$ 356.

The controller 150 may also estimate a predicted motor available torque profile 324 during the shift. The predicted motor available torque profile 324 may be an estimate of the torque available from the M/G 118 during the shift. For example, the motor available torque profile 324 may be derived from a torque/speed relationship of the M/G 118. The controller 150 may estimate a speed profile of the M/G 118 during the shift. That is, the controller 150 may predict the speed of the M/G 118 at various future times during the shift. In addition, the controller 150 may monitor the actual speed of the M/G 118 during the shift. The predicted motor available torque profile 324 may further depend on operating parameters of the traction battery 120. For example, a state of charge of the traction battery 120 may affect the amount of power available for operating the M/G 118. When the traction battery 120 is fully charged, more energy is available to operate the M/G 118 than when the traction battery 120 is nearly depleted. In addition, power limits defining an amount of power that may be provided by the traction battery 120 may affect the predicted motor available torque profile 324. The power limits may include a battery discharge power limit and a battery charge power limit. For example, as a battery discharge power limit decreases, the predicted motor available torque profile 324 may decrease. The predicted motor available torque profile 324 may also depend on a temperature of the M/G 118 and/or power electronics 156. To protect the M/G 118 and power electronics 156, the controller 150 may reduce the available torque output of the M/G 118 at higher temperatures. Note that the M/G 118 may already be producing an amount of torque to satisfy driver torque demands. The predicted motor available torque profile 324 is an estimate of the additional amount of torque that the M/G 118 can produce. The predicted motor available torque profile 324 may result from subtracting a present motor torque demand from a maximum motor torque capability. The present motor torque demand may also include demand for overcoming electrical losses. The electrical losses may vary with motor speed. As such, the electrical losses may be predicted at a target speed. The target speed may be the predicted transmission input speed immediately prior to the ratio change.

The controller 150 may be programmed to estimate the supplemental torque profile 326 and the predicted motor available torque profile 324 over a range of future time values during the shift. For example, a predicted available motor torque at the predicted maximum THF torque 334 may be computed as:

$$T_{THF\_motor\_avail} = \mathrm{MIN}\left(T_{Motor\_max}(\omega'), \frac{P_{dch\_lim} - P_{loss}(\omega')}{\omega'}\right) - (T_{DD} - T_{eng}) \quad (1)$$

where $\omega'$ is the predicted motor angular velocity at the predicted maximum THF torque 334, $T_{Motor\_max}(\omega')$ is the predicted Motor maximum torque at the angular velocity of the predicted maximum THF torque 334, $P_{dch\_lim}$ is the battery discharge power limit, $P_{loss}(\omega')$ is the predicted electrical power loss at the angular velocity of the predicted maximum THF torque 334, $T_{DD}$ is a driver demanded transmission input torque, and $T_{eng}$ is an engine torque estimate. The predicted available motor torque may be the unused motor torque capacity that is expected to be available for filling the torque hole.

At time $T_1$ 352, the off-going clutch may be commanded to reduce torque. Torque may be reduced from the off-going clutch by reducing the clutch pressure to a predetermined pressure. At time $T_2$ 354, the off-going clutch pressure may be released (e.g., pressure removed). This release of torque on the off-going clutch may result in a torque hole at the transmission output.

During the interval starting at $T_2$ 354, the supplemental torque profile 326 begins to increase toward the predicted maximum THF torque 334. The supplemental torque profile 326 may be an estimate of the additional amount of torque to be provided to fill the torque hole. That is, supplemental torque profile 326 is the amount of torque to be provided to offset the torque reduction caused by the torque hole. Starting at $T_2$ 354, the powertrain may be requested to produce torque to offset the torque hole. In this example, the M/G 118 may be requested to produce additional torque in the amount of the supplemental torque profile 326. In this example, the predicted motor torque available profile 324 is greater than the predicted maximum THF torque 334 during the entire shift. A highlighted region 332 shown in FIG. 3 depicts that at the time associated with the predicted maximum THF torque 334 (e.g., $T_3$, 356), a value of the predicted available motor torque profile 324 is greater than the predicted maximum THF torque 334. This indicates that, during the shift, the M/G 118 operates with a torque reserve. That is, the M/G 118 may satisfy the supplemental torque profile 326 during the shift.

The incremental motor torque command 328 increases the torque output of the M/G 118 by an amount corresponding to the supplemental torque profile 326 during the shift. An advantage of using the M/G 118 to fill the torque hole is that the electric machine torque responds quickly to changes. Since the M/G 118 has enough torque reserve during the shift, the torque command of the engine 114 does not need to be changed. That is, the incremental engine torque command 330 may be zero during the shift. No additional engine torque is needed so the engine torque is not altered during the shift to fill the torque hole. The engine 114 may be operated to satisfy the driver demand with no modifications during the shift.

At time $T_3$ 356, the off-going clutch may reach zero pressure (e.g., no torque) and the gear ratio may be changed. The supplemental torque profile 326 may begin decreasing after time $T_3$ 356 as the gear ratio is changed. At time $T_4$ 358, the on-coming clutch pressure may be ramped up to a predetermined final value. At time $T_5$ 360, the on-coming clutch pressure is maintained at the final value and the gear shift has been completed.

The example of FIG. 3 depicts the behavior when the predicted motor torque available profile 324 is greater than the predicted maximum THF torque 334 during the entire shift. The following example considers the behavior when the predicted motor torque available profile 324 is less than the predicted maximum THF torque 334 during part of the shift.

Figure 4:
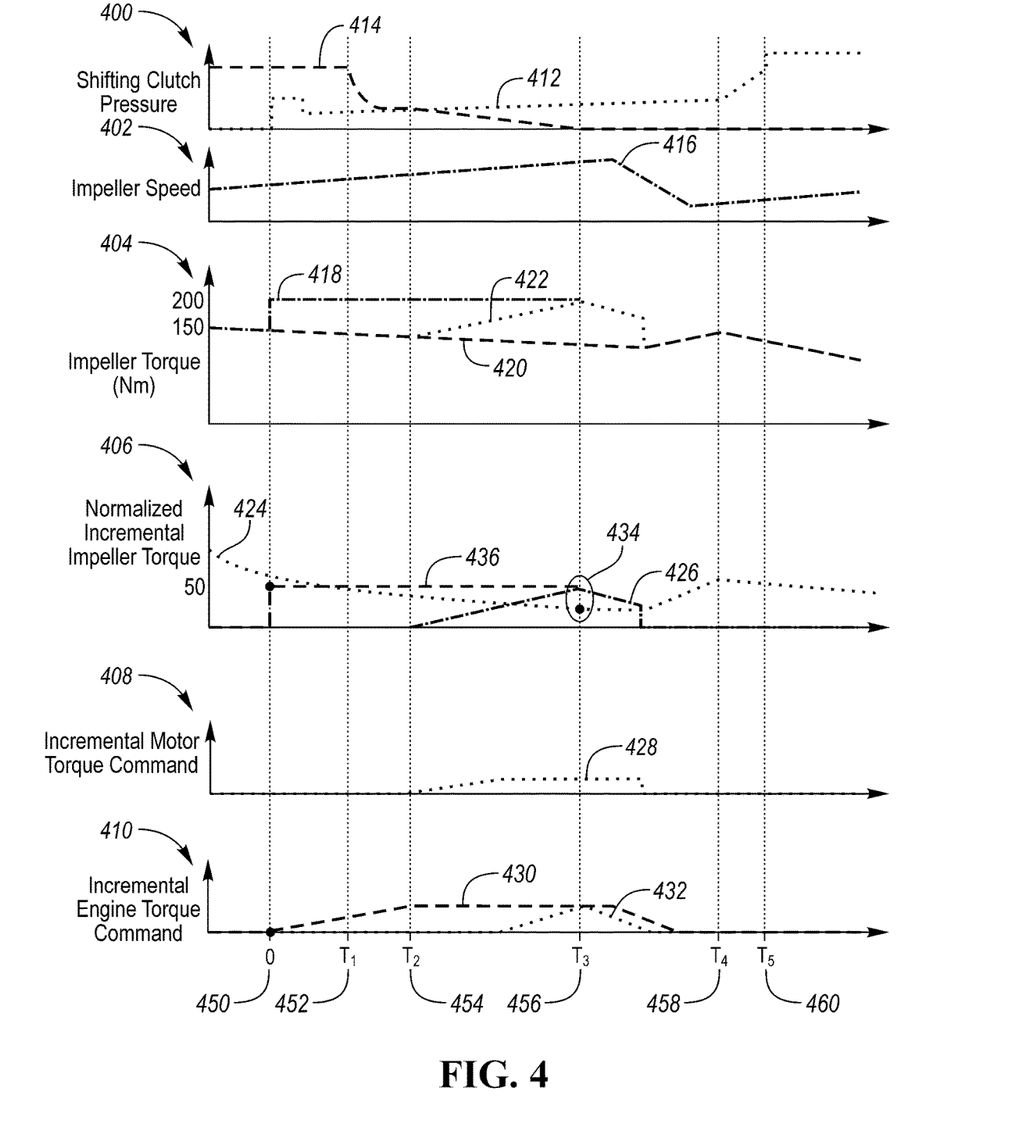
FIG. 4 depicts an example response using motor and engine torque to fill the torque hole during a shift.

FIG. 4 depicts a timing diagram for a possible upshift cycle in which the controller predicts that there is not enough motor torque to fill the torque hole. Graph 400 is a plot of clutch pressures for the shifting clutches and depicts on off-going clutch pressure 412 and an on-coming clutch pressure 414. Graph 402 is a plot of impeller speed 416 during the shift. Graph 404 is a plot of selected torques during the shift including an uncompensated impeller torque 420, a compensated impeller torque 422, and a predicted maximum compensated impeller torque 418. Graph 406 is a plot of a supplemental torque profile 426 that is the normalized amount of torque for filling the torque hole during the shift. Graph 406 also depicts a predicted available motor torque 424 and a predicted maximum THF torque 436. Graph 408 depicts an incremental motor torque command 428. Graph 410 depicts an incremental engine torque command 432 and an engine torque reserve 430. The graphs 400, 402, 404, 406, 408 and 410 share a common time scale.

The shift begins at an onset time 450. The shift may be initiated by a driver demand for torque or a change in vehicle speed. The onset time 450 may be determined as described previously herein. At the onset time 450, torque may be increased on the on-coming clutch by increasing the applied pressure of the on-coming clutch to a predetermined intermediate torque. The torque increase to the on-coming clutch prepares the on-coming clutch to carry the torque. At time zero 450, the controller 150 may execute an algorithm to predict the supplemental torque profile 426 and the predicted motor available torque 424.

At the onset of the shift (e.g., time zero 450), the controller 150 may estimate the resulting torque hole and generate the supplemental torque profile 426. The supplemental torque profile 426 may depict the torque needed to offset the torque hole to reduce the impact of the torque hole during the shift. The supplemental torque profile 426 may be an amount of torque to be added to the uncompensated impeller torque 420 to fill the torque hole that would normally occur during the shift. The supplemental torque profile 426 may define the predicted maximum THF torque 436 that is predicted during the shift. The predicted maximum THF torque 436 may be a peak value of the supplemental torque profile 426. The predicted maximum THF torque 436 may be derived from a predetermined table indexed by input torque and input speed. The predicted maximum THF torque 436 may be determined from the predicted output torque in the target gear.

The controller 150 may also estimate the predicted motor available torque profile 424 during the shift. The predicted motor available torque profile 424 may be an estimate of the torque available from the M/G 118 during the shift. The determination of the predicted motor available torque profile 424 may be as described previously herein (e.g., in relation to predicted motor available torque profile 324 of FIG. 3). The value of the predicted available motor torque profile 424 at the predicted maximum THF torque 436 may be computed as indicated in equation (1).

During the interval starting at $T_2$ 454, the supplemental torque profile 426 begins to increase toward the predicted maximum THF torque 436. The supplemental torque profile 426 may be an estimate of the additional amount of torque to be provided to fill the torque hole. That is, supplemental torque profile 426 is the amount of torque to be provided to offset the torque reduction caused by the torque hole. Starting at $T_2$ 454, the powertrain may be requested to produce torque to offset the torque hole. In this example, the predicted motor torque available profile 424 falls below the supplemental torque profile 426 during a portion of the shift duration. A highlighted region 434 shown in FIG. 4 depicts that at the time associated with the predicted maximum THF torque 436 (e.g., $T_3$, 456), a value of the predicted available motor torque 424 is less than the predicted maximum THF torque 436. This indicates that, during the shift, the M/G 118 cannot support the supplemental torque profile 426 alone. That is, the M/G 118 cannot independently satisfy the supplemental torque profile 426 during the shift.

The controller 150 may estimate or predict the supplemental torque profile 426 at or near the shift onset (e.g., at time zero 450). The controller 150 may estimate or predict the motor available torque profile 424 at or near the shift onset. In response to the supplemental torque profile 426 being greater the motor available torque profile 424 during any portion of the shift, the controller 150 may operate the engine 114 to achieve a torque reserve so that engine torque may be provided during the shift. Creating the torque reserve is initiated prior to the need for engine torque.

The engine 114 may be an internal combustion engine (ICE) or a diesel engine. The engine 114 may include a throttle valve that controls an amount of air entering the engine 114 and affects the air-fuel ratio of the engine 114. The engine 114 may include one or more fuel injectors that control an amount of fuel provided to the engine 114. The engine 114 may further include spark plugs that provide an ignition source for the air-fuel mixture within a combustion chamber of the engine 114. The engine 114 may include an electronic ignition system that controls energizing the spark plugs. The electronic ignition system may control the timing at which the spark plugs are energized relative to piston positions. The electronic ignition system may be configured to retard and advance the ignition timing. The controller 150 may be configured to interface with the throttle valve, fuel injectors, and electronic ignition system to coordinate engine operation to create a torque reserve. The controller 150 may be configured to operate the engine to achieve a torque reserve by opening the throttle valve of the engine 114. Opening the throttle valve may fill the intake manifold and permit more air to flow into the engine 114. The controller 150 may be configured to control or otherwise affect a position of the throttle valve. The controller 150 may also adjust the amount of fuel provided to fuel injectors to adjust the air-fuel ratio. The controller 150 may further operate the engine 114 to achieve a torque reserve by commanding the electronic ignition system to retard the ignition timing. In a powertrain that includes a turbocharger, the speed of the turbocharger may be increased. The net effect of opening the throttle valve and retarding the ignition timing is that the present amount engine torque may not be affected. The present engine torque may be maintained at a level to satisfy driver demand. However, as the ignition timing is retarded from normal, the engine 114 has a torque reserve in that the engine torque may be quickly increased by advancing the ignition timing. Other components and systems may be used in conjunction with the components already described to build the torque reserve, such as a variable camshaft timing (VCT) and exhaust gas recirculation systems. Additional techniques of building an engine torque reserve are possible and equally applicable to the methods described herein.

For a vehicle in which the engine 114 is a diesel engine, the torque reserve may be achieved by different methods applicable to diesel engines. For example, the engine 114 may include an exhaust gas recirculation (EGR) valve. The controller 150 may be configured to adjust a position of the EGR valve. The controller 150 may cause the torque reserve by operating the EGR valve to reduce the amount of exhaust that is recirculated and by modifying the amount of fuel provided. Other techniques of building an engine torque reserve in a diesel engine are possible and equally applicable to the methods described herein.

The engine torque reserve 430 may begin to increase starting after time zero 450 (e.g., shift onset). The engine torque reserve 430 may be increased to an amount corresponding to a peak difference between the supplemental torque profile 426 and the predicted available motor torque 424. In some configurations, an additional safety margin may be added to the engine torque reserve 430 to account for any changes in the motor available torque 424 during the shift. The engine torque reserve 430 may reach a peak value before the actual engine torque is increased according to the incremental engine torque command 432. The engine torque reserve 430 may have a peak value that is the difference between the predicted maximum THF torque 436 and the predicted available motor torque 424 at the time associated with the predicted maximum THF torque 436 (e.g., $T_3$, 456).

By creating an engine torque reserve in advance of the need for engine torque, the powertrain can better fill the torque hole that occurs during the shift. In this example, the M/G 118 acting alone cannot satisfy the supplemental torque profile 426 and the engine 114 must be operated to satisfy the deficiency. Torque response time is improved by predicting the need for engine torque in advance and creating the engine torque reserve. The engine torque reserve may be quickly utilized by advancing the ignition timing during the shift. Such a system responds more effectively than those systems that wait until the engine torque is needed to open the throttle valve.

In this example, the controller 150 predicts at the onset of the shift (e.g., time zero 450) that the electric machine torque cannot satisfy the entire demand of the supplemental torque profile 426. The supplemental torque profile 426 may be then satisfied with a combination of electric machine torque and engine torque. The controller 150 may be configured to satisfy the supplemental torque profile 426 with electric machine torque to the extent possible. That is, the incremental motor torque command 428 may be increased up to the predicted motor available torque profile 424 during the shift. The incremental motor torque command 428 may be limited to an amount reflecting a maximum difference between the supplemental torque profile 426 and the available motor torque profile 424 during the shift. For example, at 434, the difference between the supplemental torque profile 426 and the available motor torque profile 424 may be a maximum value.

Similar to the previous examples, at time $T_1$ 452, the off-going clutch may be commanded to reduce torque. Torque may be reduced from the off-going clutch by reducing the clutch pressure to a predetermined pressure. At time $T_2$ 454, the off-going clutch pressure may be released (e.g., pressure removed). This release of torque on the off-going clutch may result in a torque hole at the transmission output.

The incremental motor torque command 428 increases the torque output of the M/G 118 by an amount corresponding to the supplemental torque profile 326 during the shift. As the M/G 118 does not have enough torque reserve during the shift, the torque command of the engine 114 is also modified. That is, the incremental engine torque command 432 may be modified during the shift. The engine 114 may be commanded to produce additional torque in the amount of the incremental engine torque command 432 to achieve the supplemental torque profile 426.

At time $T_3$ 356, the off-going clutch may reach zero pressure (e.g., no torque) and the gear ratio may be changed. The supplemental torque profile 326 may begin decreasing after time $T_3$ 356 as the gear ratio is changed. When reducing the torque, the engine torque may be decreased before the motor torque is decreased. As the engine torque is reduced, the torque reserve may also be reduced. When the supplemental torque profile 426 is zero, the torque reserve may be reduced to the pre-shift level. The engine 114 may be operated by changing the throttle valve and the ignition timing to restore the operating point of the engine 114 to pre-shift levels.

At time $T_4$ 458, the on-coming clutch pressure may be ramped up to a predetermined final value. At time $T_5$ 460, the on-coming clutch pressure is maintained at the final value and the gear shift has been completed.

Figure 5A:
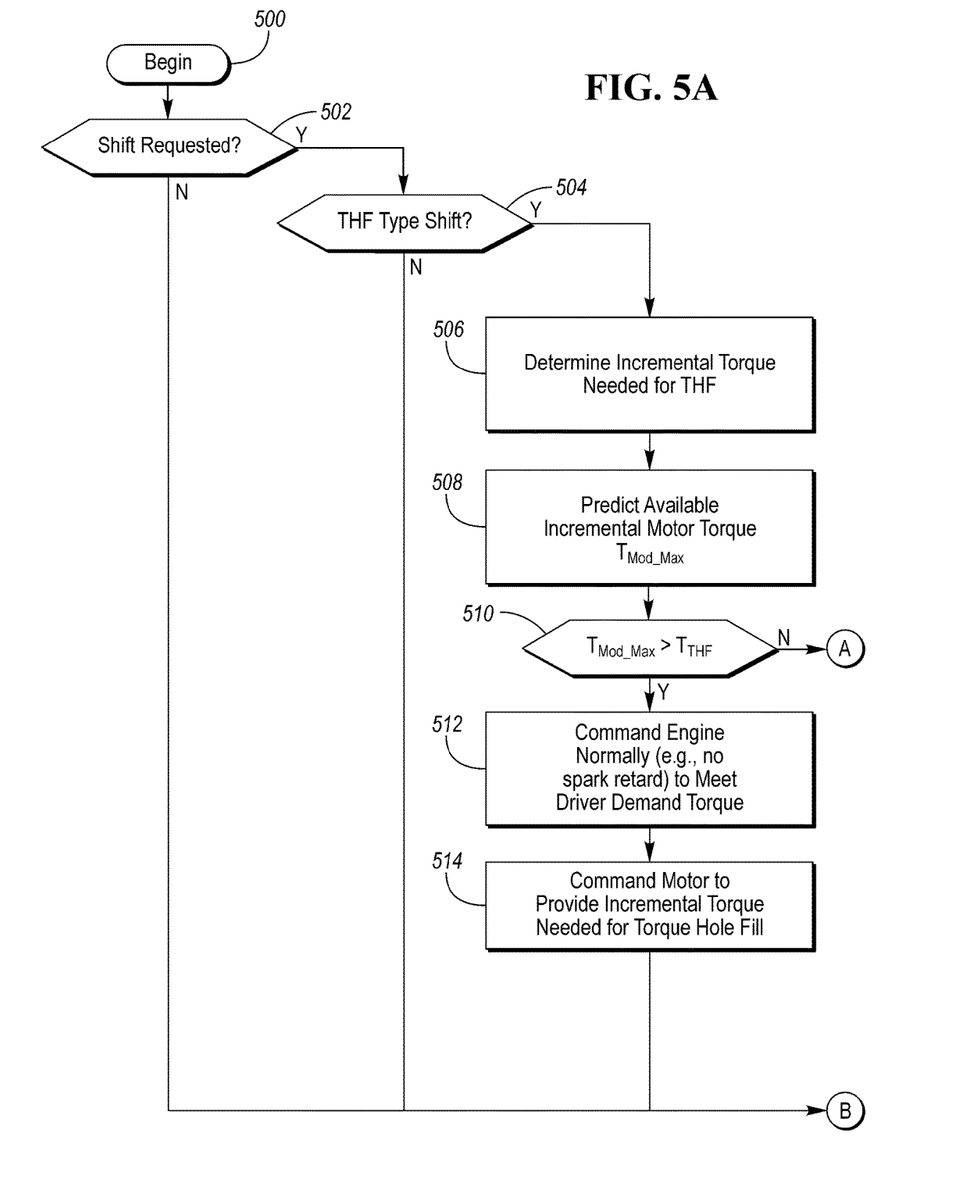
FIGS. 5A and 5B are a flowchart depicting a possible sequence of operation for filling the torque hole during a shift.
Figure 5B:
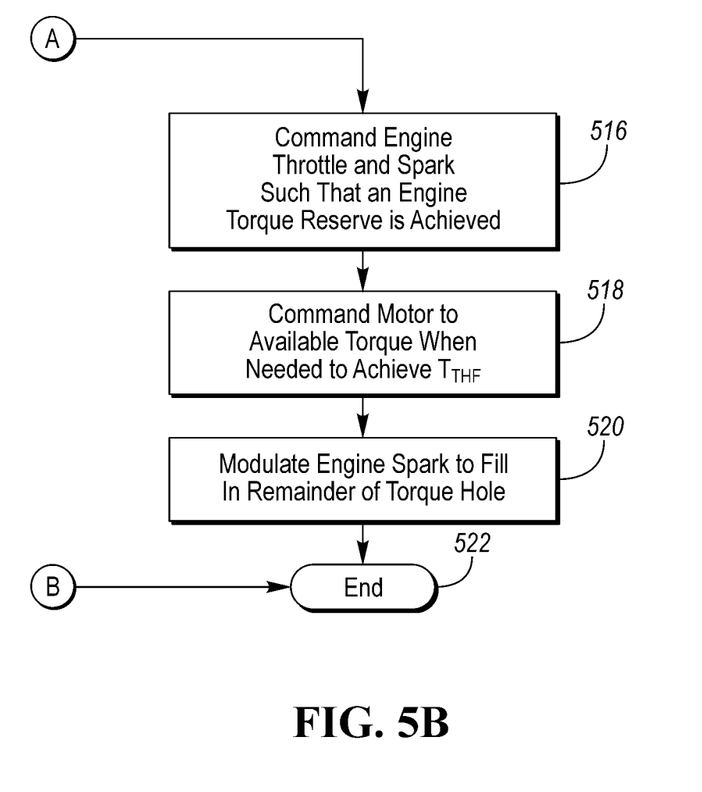

FIGS. 5A and 5B depict a flow chart describing a sequence of possible operations that may be implemented in a controller 150 (e.g., PCU) that is part of a powertrain control system. At operation 500, execution begins. At operation 502, a check may be performed to determine if a shift is requested. If no shift is requested, then operation 522 may be performed to terminate the sequence.

If a shift is requested, operation 504 may be performed. At operation 504, a check may be performed to determine if the shift is of a type that will benefit from the torque hole fill (THF) strategy. For example, an upshift may benefit from the THF strategy so a check may be performed to determine if the shift is an upshift. If the shift will not benefit from the torque hole fill strategy, then operation 522 may be performed to terminate the sequence.

If the shift will benefit from the torque hole fill strategy, operation 506 may be performed. At operation 506, the incremental torque for torque hole fill (e.g., supplemental torque profile) may be determined as described previously herein. For example, the supplemental torque profile may be function of a turbine speed and a turbine torque. The supplemental torque profile may be a function of the output torque in the target gear.

At operation 508, the predicted available motor torque (e.g., available incremental motor torque) may be computed as described previously herein. The predicted available incremental motor torque may be a function of battery discharge power limits, a rate of change of input speed, and a Motor maximum torque. At operation 510, a check may be performed to determine if the predicted available motor torque is greater than the predicted supplemental torque profile. If the predicted available motor torque is greater than the predicted supplemental torque profile, then operations 512 and 514 may be performed to utilize only motor torque to achieve the torque hole fill. At operation 512, the engine 114 may be commanded to meet driver demand torque. That is, the engine 114 is operated to satisfy driver demand without building torque reserve. For example, engine operation is not altered by spark retard. At operation 514, the M/G 118 may be commanded to provide the supplemental torque profile during the shift. When the shift is completed, operation 522 may be performed to terminate the sequence.

If the predicted available motor torque is less than or equal to the predicted supplemental torque profile, then operations 516, 518 and 520 may be performed. At operation 516, the engine 114 may be commanded to create a torque reserve at the onset of the shift as described previously herein. For example, the engine throttle valve and ignition timing may be adjusted to create an amount of engine torque reserve. At operation 518, the M/G 118 may be commanded up to the predicted available motor torque. When the supplemental torque profile is more than the predicted available motor torque, the difference is made up by operating the engine to achieve the torque difference. At operation 520, the engine 114 may be operated by changing the ignition/spark timing (e.g. advance ignition timing) to satisfy the remaining torque to fill the torque hole. That is, the engine 114 is operated to utilize the torque reserve to achieve the remaining torque. When the shift is completed, operation 522 is performed to terminate the sequence.

The control strategy that is disclosed can improve the torque hole fill during an upshift of the gearbox 124. The supplemental torque needed to fill the torque hole is determined in advance and, if engine torque will be needed to fill the torque hole, an engine torque reserve is created in advance in anticipation of increasing engine torque during the shift. At the time when engine torque is needed, the engine can change the torque in a timely manner. Without building the torque reserve in advance, additional lag in the provision of engine torque makes the torque hole fill less effective. The strategy provides a more consistent torque hole fill as the traction battery state of charge fluctuates.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine and an electric machine coupled to a gearbox; and
   a controller programmed to, responsive to an onset of a shift of the gearbox and a predicted supplemental torque profile, that defines torque to be applied during the shift to fill a torque hole, exceeding a predicted available electric machine torque during the shift, operate the engine from the onset to achieve a torque reserve in anticipation of increasing engine torque.

2. The vehicle of claim 1 wherein the controller is further programmed to operate the engine and the electric machine to achieve the predicted supplemental torque profile during the shift.

3. The vehicle of claim 1 wherein the controller is further programmed to operate the engine to achieve the torque reserve by opening a throttle valve of the engine.

4. The vehicle of claim 1 wherein the controller is further programmed to operate the engine to achieve the torque reserve by retarding an ignition timing.

5. The vehicle of claim 1 wherein the torque reserve is an amount of torque that is greater than or equal to a maximum difference between the predicted supplemental torque profile and the predicted available electric machine torque.

6. The vehicle of claim 1 wherein the controller is further programmed to, responsive to the predicted supplemental torque profile being less than the predicted available electric machine torque, operate the electric machine to achieve the predicted supplemental torque profile.

7. The vehicle of claim 1 wherein the controller is further programmed to, during the shift, operate the engine to increase engine torque by advancing an ignition timing.

8. The vehicle of claim 1 wherein the controller is further programmed to, during the shift, operate the electric machine to output torque up to the predicted available electric machine torque before operating the engine to satisfy the predicted supplemental torque profile.

9. The vehicle of claim 1 wherein the predicted supplemental torque profile is based on one or more of a turbine speed of a torque converter coupled to the gearbox, a turbine torque of the torque converter, and an output torque in a target gear.

10. A powertrain control system comprising:
    a controller programmed to, responsive to an onset of a shift of a gearbox and a predicted supplemental torque profile, that defines torque to be applied during the shift to fill a torque hole, exceeding a predicted available torque of an electric machine coupled to the gearbox during the shift, operate an engine coupled to the gearbox at the onset of the shift to achieve a torque reserve.

11. The powertrain control system of claim 10 wherein the controller is further programmed to operate the engine to achieve the torque reserve by opening a throttle valve of the engine and retarding an ignition timing.

12. The powertrain control system of claim 11 wherein the controller is further programmed to, during the shift, operate the electric machine to output torque up to the predicted available torque before operating the engine by advancing the ignition timing to satisfy the predicted supplemental torque profile.

13. The powertrain control system of claim 10 wherein the controller is further programmed to, responsive to the predicted supplemental torque profile being less than the predicted available torque, operate the electric machine to achieve the predicted supplemental torque profile.

14. The powertrain control system of claim 10 wherein the controller is further programmed to, during the shift, operate the electric machine to output torque up to the predicted available torque before operating the engine to satisfy the predicted supplemental torque profile.

15. The powertrain control system of claim 10 wherein the torque reserve is an amount of torque that is greater than or equal to a maximum difference between the predicted supplemental torque profile and the predicted available torque during the shift.

16. A method comprising:
predicting, by a controller, at an onset of a shift of a gearbox, a supplemental torque profile for filling a torque hole and an available torque of an electric machine coupled to the gearbox; and
operating, by the controller, an engine coupled to the gearbox to achieve a torque reserve at the onset of the shift in response to the supplemental torque profile exceeding the available torque.

17. The method of claim 16 further comprising operating, by the controller, the electric machine to satisfy the supplemental torque profile during the shift up to the available torque before increasing torque of the engine.

18. The method of claim 16 further comprising operating, by the controller, the engine to achieve the torque reserve by opening a throttle valve of the engine and retarding an ignition timing.

19. The method of claim 18 further comprising operating, by the controller, the electric machine to output torque up to the available torque before operating the engine by advancing the ignition timing to satisfy the supplemental torque profile.

20. The method of claim 16 wherein the torque reserve is an amount of torque that is greater than or equal to a maximum difference between the supplemental torque profile and the available torque during the shift.

* * * * *